United States Patent

Schoonover

(10) Patent No.: US 7,953,575 B2
(45) Date of Patent: May 31, 2011

(54) ELECTRICAL SUBMERSIBLE PUMP ROTATION SENSING USING AN XY VIBRATION SENSOR

(75) Inventor: Larry Schoonover, Aberdeen (GB)

(73) Assignee: Baker Hughes Incorporated, Houston, TX (US)

(*) Notice: Subject to any disclaimer, the term of this patent is extended or adjusted under 35 U.S.C. 154(b) by 31 days.

(21) Appl. No.: 12/360,677

(22) Filed: Jan. 27, 2009

(65) Prior Publication Data

US 2010/0191484 A1    Jul. 29, 2010

(51) Int. Cl.
*G01P 3/00* (2006.01)

(52) U.S. Cl. .................................................. 702/145

(58) Field of Classification Search ............... 702/145, 702/56, 151
See application file for complete search history.

(56) References Cited

U.S. PATENT DOCUMENTS

| | | | |
|---|---|---|---|
| 5,038,614 A * | 8/1991 | Bseisu et al. ............... | 73/592 |
| 5,397,949 A * | 3/1995 | Guardiani et al. .......... | 310/51 |
| 6,167,965 B1 | 1/2001 | Bearden et al. | |
| 6,466,002 B1 | 10/2002 | Elsner | |
| 6,566,774 B2 | 5/2003 | Parmeter et al. | |
| 2004/0013222 A1* | 1/2004 | Hikida et al. ............... | 376/372 |
| 2004/0216525 A1* | 11/2004 | Hikida et al. ............... | 73/660 |
| 2004/0251027 A1 | 12/2004 | Sonnier | |
| 2005/0072239 A1* | 4/2005 | Longsdorf et al. ......... | 73/649 |
| 2009/0043530 A1* | 2/2009 | Sittler et al. ............... | 702/141 |
| 2010/0202581 A1* | 8/2010 | Kitajima et al. ............ | 376/245 |
| 2010/0247335 A1* | 9/2010 | Atherton ..................... | 417/53 |

FOREIGN PATENT DOCUMENTS

| | | | |
|---|---|---|---|
| JP | 05-033799 | * | 2/1993 |
| WO | WO 2006/127939 A2 | | 11/2006 |
| WO | WO 2008/152376 A1 | | 12/2008 |

OTHER PUBLICATIONS

Baker Hughes Centrilift, Data Sheet, 2 pages, 2007.

* cited by examiner

*Primary Examiner* — Cindy Hien-Dieu Khuu
(74) *Attorney, Agent, or Firm* — Bracewell & Giuliani LLP

(57) ABSTRACT

When an electrical submersible pump motor runs, rotary vibrations occur in the same direction as the rotation of the motor. This vibration can be detected by an XY vibration sensor. Depending on the rotation direction, the vibration along the X-axis will be out of phase +90 degrees or −90 degrees with the vibration in the Y-axis. To determine the rotation direction, the vibration sensor measures a vibration of an ESP pump in two axes, recording first and second vibration signals. Next, whether the first signal either leads or lags the second signal is determined by, for example, comparing correlations of the first and second signal with the second signal shifted by plus and minus one-fourth of the period of rotation. Then a direction of a rotation of the electrical submersible pump can be determined responsive to the determination of whether the first signal either leads or lags the second signal.

15 Claims, 7 Drawing Sheets

Top View

Clockwise Rotation

Counter-Clockwise Rotation

Clockwise Rotation

Counter-Clockwise Rotation

ELECTRICAL SUBMERSIBLE PUMP ROTATION SENSING USING AN XY VIBRATION SENSOR

BACKGROUND

1. Field of Invention

The present invention is directed, in general, to diagnostic systems for subterranean pumping equipment and, in particular, to rotation sensing utilizing downhole vibration sensors.

2. Background

Electrical submersible pump (ESP) assemblies include an electric motor and a pump that is used to pump oil or other fluids within a wellbore. The electric motor has a rotatable rotor that is contained in a stationary stator. When the motor operates, the rotor rotates causing rotary vibrations of the ESP assembly to occur. These vibrations occur in the same direction as the rotation of the rotor.

Today, downhole vibration sensors are utilized to continuously monitor vibrations generated by rotating components of ESP assemblies. Pre-established vibration thresholds are utilized to indicate excessive wear, damage and impending failure.

SUMMARY OF INVENTION

Embodiments of the present invention provide a rotation sensor for an electrical submersible pump assembly utilizing an XY vibration sensor. An XY vibration sensor is a sensor that measures vibration in two dimensions, or along two axes. The first axis, called the X-axis, is typically perpendicular to the second axis, called the Y-axis.

Using an XY vibration sensor as a rotation sensor allows an operator to determine whether the pump is rotating and to verify the direction of the rotation. The determined direction of rotation can then be compared to an expected rotation. Responsive to a comparison of the determined direction of rotation to an expected direction of rotation, an operator can be alerted of a status of the electrical submersible pump, and any suggested maintenance can be performed. For example, the determined direction of rotation being the opposite direction of the expected direction of rotation can suggest that wires may be crossed, metaphorically or literally. Also, when a rotation is expected, a determination of no rotation can indicate a failure.

When a motor in an ESP assembly operates, the rotor rotates causing rotary vibrations to occur. These vibrations occur in the same direction as the rotation of the rotor. The rotational vibration of the rotor results in an acceleration then deceleration in a sinusoidal or harmonic fashion in the X direction. Similarly, the rotational vibration of the rotor results in a sinusoidal or harmonic pattern of acceleration then deceleration in the Y direction. As understood by those skilled in the art, the sinusoidal or harmonic pattern can be distorted and also contain noise. For an example orientation of the vibration sensor, a clockwise vibration results in a positive acceleration on the X-axis and one-fourth of the period of the rotation later, or 90 degrees later, a positive acceleration on the Y-axis. Similarly, a counter-clockwise rotation results in a positive acceleration on the Y-axis one-fourth of the period of the rotation before, or 90 degrees before, a positive acceleration on the X-axis. That is, for a clockwise rotation, the vibration in the X-axis leads the vibration in the Y-axis; for a counter-clockwise rotation, the vibration in the X-axis lags the vibration in the Y-axis. Of course, for an alternate example orientation of the vibration sensor, the relationship between lead and lag and clockwise and counter-clockwise are reversed.

To sense a rotation of an electrical submersible pump in example embodiments, a sensor measures an acceleration of an electrical submersible pump in a first axis and in a second axis to thereby record a first signal and a second signal. For example, an XY vibration sensor can measure a vibration of an ESP pump in two axes, creating first and second vibration signals. Next, whether the first signal either leads or lags the second signal is determined. Then a direction of a rotation of the electrical submersible pump is determined responsive to the determination of whether the first signal either leads or lags the second signal.

In example embodiments, determining whether the first signal either leads or lags the second signal includes determining a frequency of the rotation of the electrical submersible pump to thereby identify a period of the rotation. Determining the frequency of the rotation can involve analyzing data from a surface motor controller; alternately, determining the frequency of the rotation can include performing a Fourier analysis, or other frequency analysis as understood by those skilled in the art, on the first vibration signal, the second vibration signal, or both and then identifying a frequency peak. Once the period of rotation is known, the first signal is correlated to the second signal shifted by minus one-fourth of the identified period of the rotation. Also, the first signal is correlated to the second signal unshifted. And the first signal is correlated to the second signal shifted by plus one-fourth of the identified period of the rotation. These three correlations are compared to determine if the electrical submersible pump is experiencing a clockwise rotation, no rotation, or a counter-clockwise rotation. If the ESP device is experiencing rotational vibration, one of the shifted correlations will be much larger than the other and also larger than the correlation with no shift, indicating that the electrical submersible pump is experiencing a clockwise rotation or a counter-clockwise rotation. Next, the determined direction of rotation of the electrical submersible pump can be compared to an expected direction of rotation, so that an operator can be alerted of a status of the electrical submersible pump, and any suggested maintenance can be performed.

In other example embodiments, determining whether the first signal either leads or lags the second signal includes correlating the first signal to the second signal for a plurality of shifts of the second signal. By utilizing numerous shifts, false determinations due to vibrational noise or measurement error can be eliminated. Next, a period of the rotation of the electrical submersible pump is determined. The period can be a value between periodic peaks of the correlation of the first and second signals for the plurality of shifts of the second signal. Then a peak is identified, wherein the peak is one of the periodic peaks between about plus one-fourth and about minus one-fourth of the determined period of the rotation. Responsive to the sign of a phase shift at the identified peak, whether the first signal either leads or lags the second signal is determined. For an example orientation, for a clockwise rotation, the phase shift at the identified peak is negative, or falls between zero and about minus one-fourth of the determined period of the rotation; likewise, for a counter-clockwise rotation, the phase shift at the identified peak is positive, or falls between zero and about plus one-fourth of the determined period of the rotation.

In addition, example embodiments include a rotation sensor apparatus for an electrical submersible pump assembly, including an XY vibration sensor and a processor. Example embodiments can also include other systems, program products, methods, and apparatuses for sensing the rotation of an electrical submersible pump utilizing an XY vibration sensor, as understood by those skilled in the art.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Example embodiments provide a rotation sensor for an electrical submersible pump assembly utilizing an XY vibration sensor. Electrical submersible pump assemblies include an electric motor and a pump that is used to pump oil or other fluids within a wellbore. The electric motor has a rotatable rotor that is contained in a stationary stator. When the motor operates, the rotor rotates causing rotary vibrations to occur. These vibrations occur in the same direction as the rotation of the rotor. The rotational vibration of the rotor results in an acceleration then deceleration in a sinusoidal or harmonic fashion in the X direction. Similarly, the rotational vibration of the rotor results in a sinusoidal or harmonic pattern of acceleration then deceleration in the Y direction. As understood by those skilled in the art, the sinusoidal or harmonic pattern can be distorted and also contain noise. By analyzing the vibrations in both directions, the rotation of the ESP can be sensed, with the direction of the rotation being determined.

Using the XY vibration sensor as a rotation sensor allows an operator to determine whether the motor is rotating and to verify the direction of the rotation. The determined direction of rotation can then be compared to an expected rotation so that an operator can be alerted of a status of the electrical submersible pump, and any suggested maintenance can be performed. For example, the determined rotation being the opposite direction of the expected rotation can suggest that wires may be crossed, metaphorically or literally. Also, when a rotation is expected, a determination of no rotation can indicate a failure.

Figure 1:
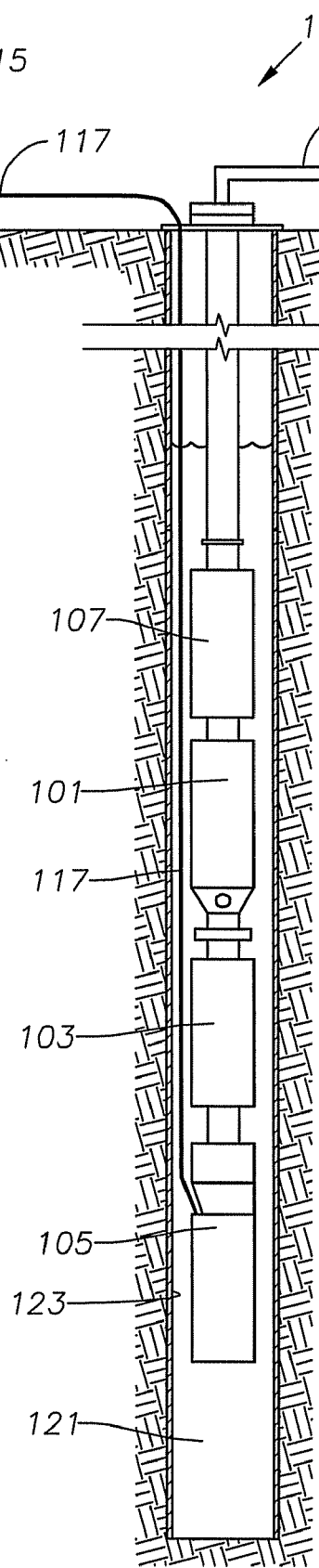
FIG. 1 block diagram illustrating a electrical submersible pump assembly including a vibration sensor according to an example embodiment.

With reference now to FIG. 1, an example embodiment of an electrical submersible pump system 100 includes a centrifugal pump 101, a pump motor 105, and a seal assembly 103 located between the pump 101 and motor 105. The pump 101, seal assembly 103, and motor 105 are located within a borehole 121, inside a standard well casing 123. The ESP system 100 further includes a variable speed drive 111, a controller 113, and an optional transformer 115 located on the surface 125. A three-phase power cable 117 provides power and communications between the variable speed drive 111 (or optional transformer 115) and the pump motor 105. The variable speed drive 111 can operate as a power source by providing electrical power for driving the motor 105. The cable 117 typically extends thousands of feet and thereby introduces significant electrical impedance between the variable speed drive 111 (or optional transformer 115) and the pump motor 105. By altering the output voltage and frequency of the variable speed drive 111, the controller 113 associated with the variable speed drive 111 controls the voltage at motor 105 terminals, and thus the operation of the pump.

With further reference now to FIG. 1, an example embodiment of an electrical submersible pump system 100 further includes a sensor section 107, containing, for example, an XY vibration sensor, within the borehole. The sensor section 107 can also contain a processor in communication with the XY vibration sensor and capable of determining a rotation of the electrical submersible pump utilizing the XY vibration sensor. Alternately, the processor can be located at the surface.

Figure 2A:
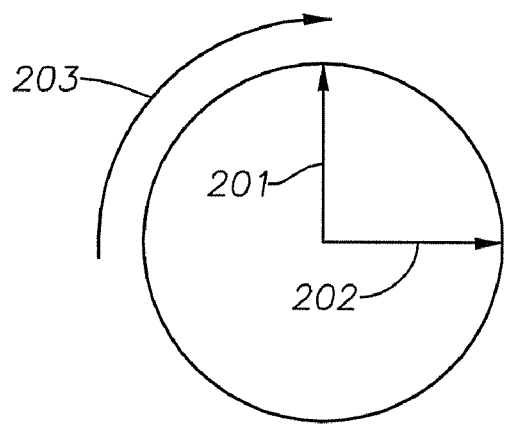
FIG. 2A is a top view illustrating an X-axis, Y-axis, and rotation and vibration directions according to an example embodiment.
Figure 2B:
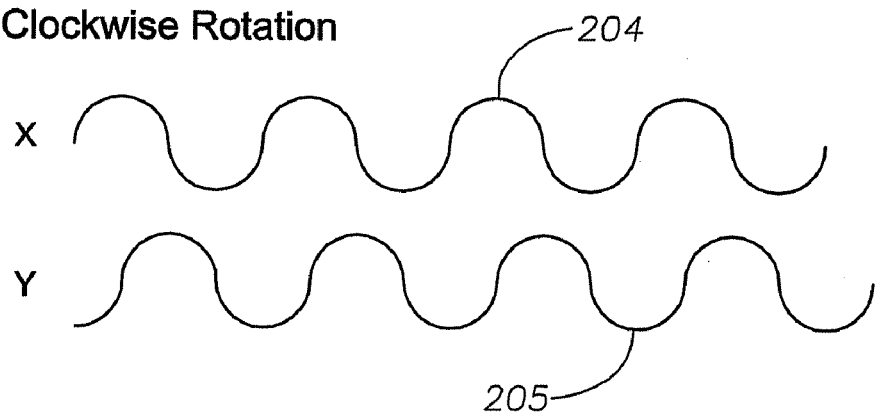
FIGS. 2B and 2C are graphical representations of vibration signals according to example embodiments.
Figure 2C:
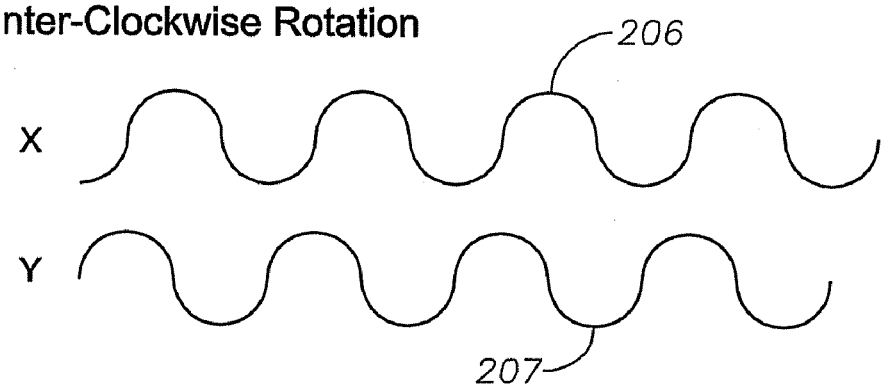

With reference now to FIGS. 2A, 2B, and 2C, an example embodiment provides for a rotation sensor for an electrical submersible pump assembly utilizing an XY vibration sensor. An orientation of the XY vibration sensor can have, for example, a +X direction 201, a +Y direction 202, and a clockwise direction of motor rotation and of vibration 203 as shown in FIG. 2A. For an example orientation of the XY vibration sensor as shown in FIG. 2A, a clockwise vibration 203 will result in a positive acceleration on the X-axis 204 and one-fourth of the period of the rotation later, or 90 degrees later, a positive acceleration on the Y-axis 205 as shown in FIG. 2B. That is, a first vibration signal in the X-axis 204 will lead a second vibration signal in the Y-axis 205. For an example orientation of the XY vibration sensor as shown in FIG. 2A, a counter-clockwise vibration will result in a positive acceleration on the Y-axis 207 and one-fourth of the period of the rotation later, or 90 degrees later, a positive acceleration on the X-axis 206 as shown in FIG. 2C. That is, a first vibration signal in the X-axis 206 will lag a second vibration signal in the Y-axis 207. Those having skill in the art will recognize that alternate orientations, especially for the X-axis and Y-axis, are within the scope and teachings of the example embodiments.

Figure 3A:
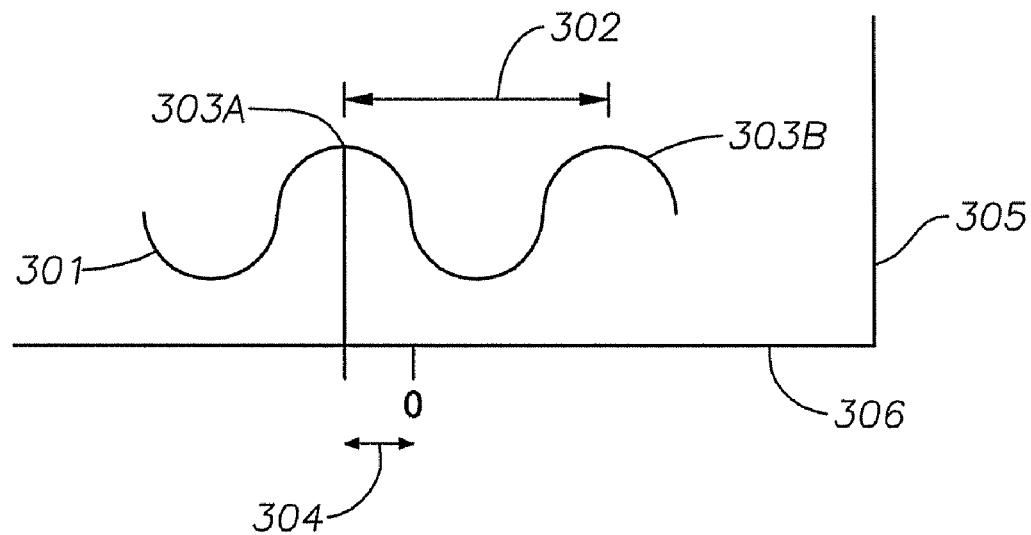
FIGS. 3A and 3B are graphical representations of correlations of vibration signals according to example embodiments.
Figure 3B:
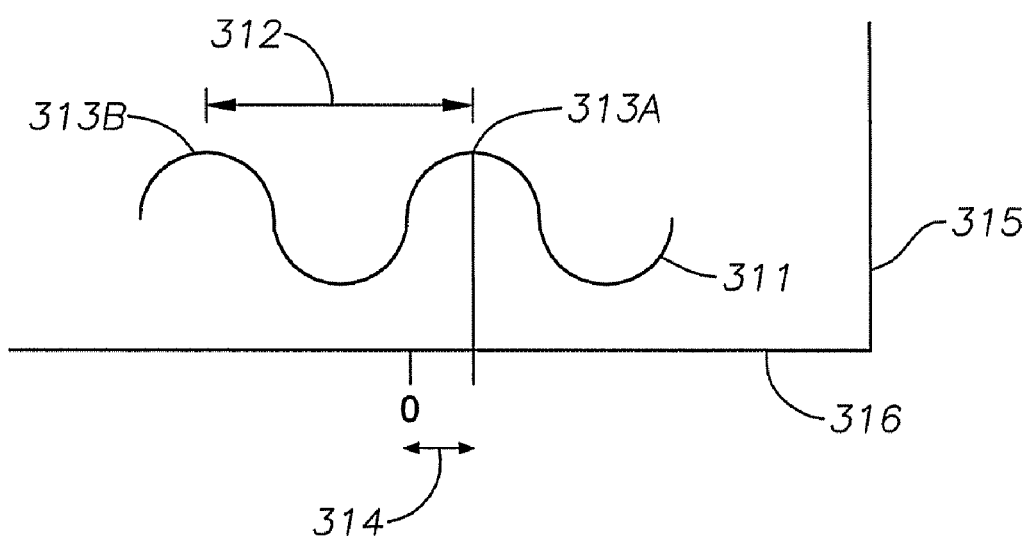

With reference now to FIGS. 3A and 3B, example embodiments provide for determining a direction of a rotation of an electrical submersible pump.

FIG. 3A illustrates determining a clockwise rotation. FIG. 3A illustrates a correlation of a first vibration signal in the X-axis and a shifted second vibration signal in the Y-axis, as a function of the plurality of shifts, as shown in 301. The graphical representation depicts an amplitude of correlation in the vertical axes 305 versus an amount of shift in the second vibration signal in the horizontal axis 306. If the ESP assembly is experiencing rotational vibration, there will be a periodic peak in the correlation, as shown at 303A and 303B. The period of the rotation 302 of the electrical submersible pump can be determined. The period of the rotation 302 is a value, or distance, between periodic peaks 303A, 303B of the correlation of the first and second signals for the plurality of shifts of the second signal. Next, a peak of the periodic peaks can be identified between about plus one-fourth and about minus one-fourth of the determined period of the rotation, as shown at 303A. Whether the first signal either leads or lags the second signal can be determined responsive to the sign of the phase shift at the identified peak. That is, because the phase shift 304 at the identified peak 303A is negative, or left of zero, the first signal leads the second signal. Thus, a clockwise rotation is determined.

Alternately, FIG. 3B illustrates determining a counter-clockwise rotation. FIG. 3B illustrates a correlation of a first vibration signal in the X-axis and a shifted second vibration signal in the Y-axis, as a function of the plurality of shifts, as shown in 301. The graphical representation depicts an amplitude of correlation in the vertical axes 315 versus an amount of shift in the second vibration signal in the horizontal axis 316. If the ESP assembly is experiencing rotational vibration, there will be a periodic peak in the correlation, as shown at 313A and 313B. The period of the rotation 312 of the electrical submersible pump can be determined. The period of the rotation 312 is a value, or distance, between periodic peaks 313A, 313B of the correlation of the first and second signals for the plurality of shifts of the second signal. Next, a peak of the periodic peaks can be identified between about plus one-fourth and about minus one-fourth of the determined period of the rotation, as shown at 313A. Whether the first signal either leads or lags the second signal can be determined responsive to the sign of the phase shift at the identified peak. That is, because the phase shift 314 at the identified peak 313A is positive, or right of zero, the first signal lags the second signal. Thus, a counter-clockwise rotation is determined.

Figure 4:
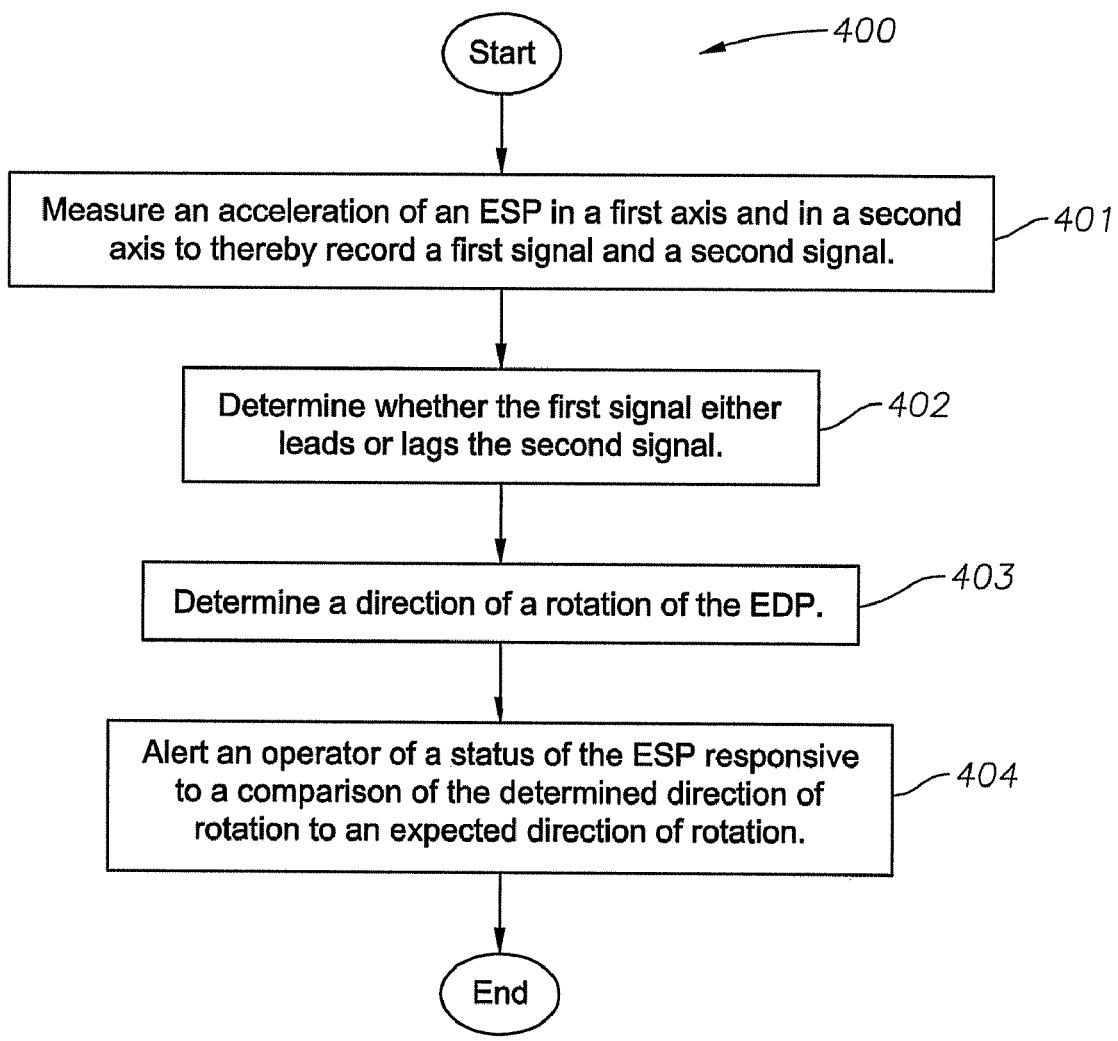
FIG. 4 is a flow diagram of a method of sensing a rotation of an electrical submersible pump according to an example embodiment.

With reference now to FIG. 4, an example embodiment includes a method 400 of sensing a rotation of an electrical submersible pump. The method 400 can include measuring an acceleration of an electrical submersible pump in a first axis and in a second axis to thereby record a first signal and a second signal 401. The method 400 can include determining whether the first signal either leads or lags the second signal 402. The method 400 can include determining a direction of a rotation of the electrical submersible pump 403 responsive to the determination of whether the first signal either leads or lags the second signal. The method 400 can also include alerting an operator of a status of the electrical submersible pump responsive to a comparison of the determined direction of rotation to an expected direction of rotation 404.

Figure 5:
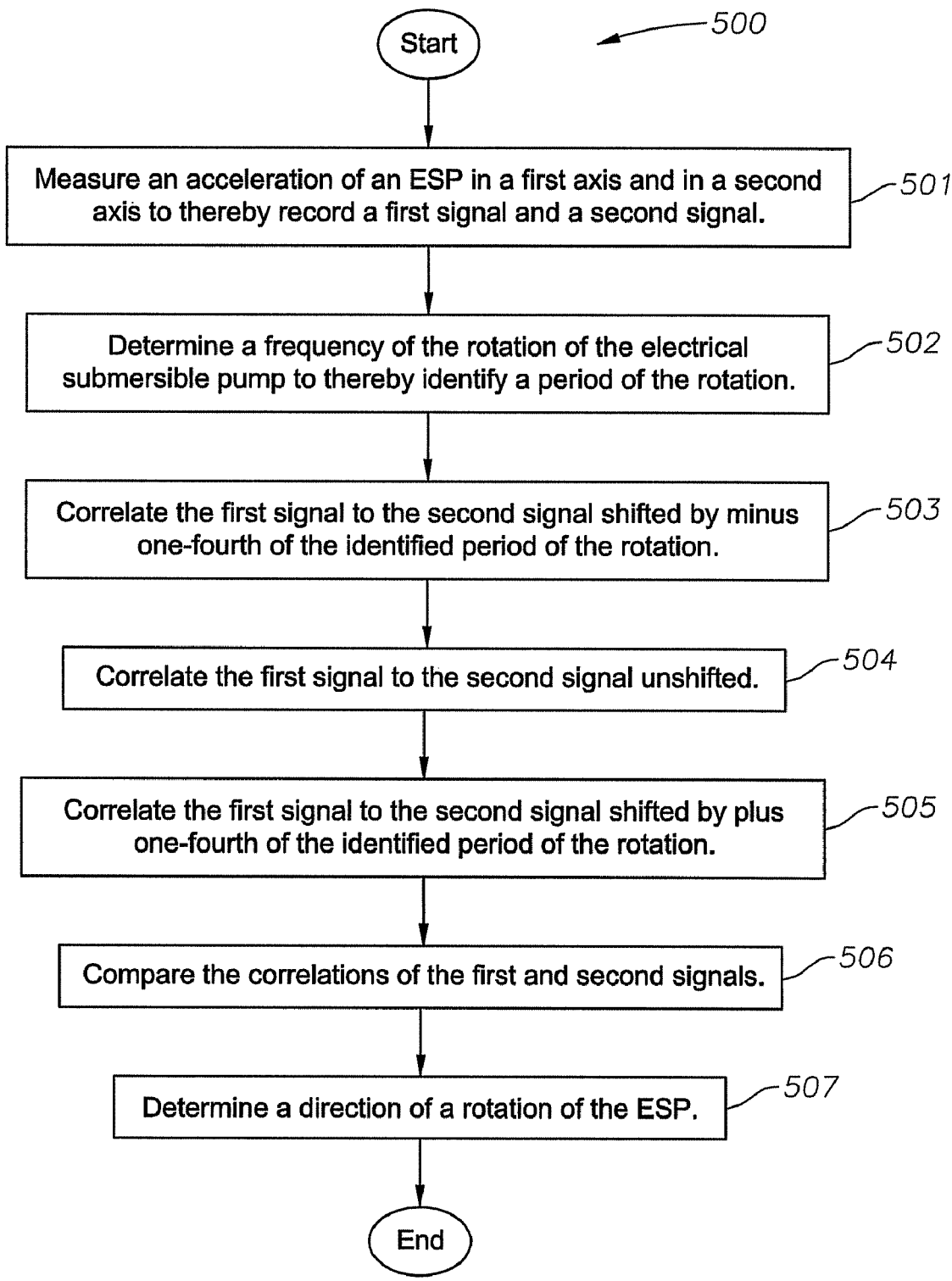
FIG. 5 is a flow diagram of a method of sensing a rotation of an electrical submersible pump according to another example embodiment.

With reference now to FIG. 5, an example embodiment includes a method 500 of sensing a rotation of an electrical submersible pump. The method 500 can include measuring an acceleration of an electrical submersible pump in a first axis and in a second axis to thereby record a first signal and a second signal 501. The method 500 can include determining a frequency of the rotation of the electrical submersible pump to thereby identify a period of the rotation 502. Determining the frequency of the rotation can involve, for example, analyzing data from a surface motor controller; alternately, determining the frequency of the rotation can include performing a Fourier analysis, or other frequency analysis as understood by those skilled in the art, on the first vibration signal, the second vibration signal, or both and then identifying a frequency peak. The method 500 can include correlating the first signal to the second signal shifted by minus one-fourth of the identified period of the rotation 503, correlating the first signal to the second signal unshifted 504, and correlating the first signal to the second signal shifted by plus one-fourth of the identified period of the rotation 505. The method 500 can include comparing the correlations of the first and second signals 506 to determine whether the first signal either leads or lags the second signal. The method 500 can include determining a direction of a rotation of the electrical submersible pump 507 responsive to the determination of whether the first signal either leads or lags the second signal.

Figure 6:
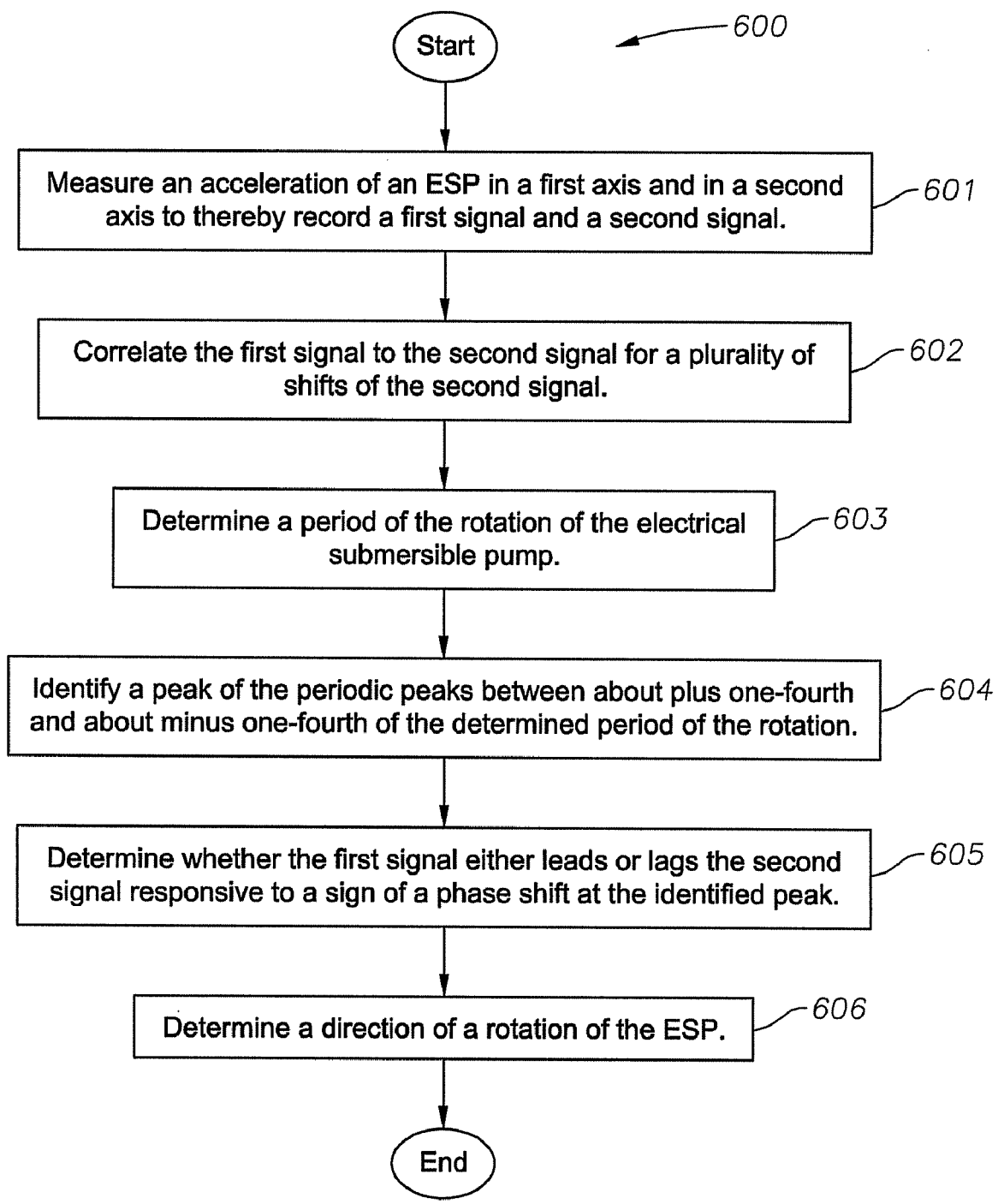
FIG. 6 is a flow diagram of a method of sensing a rotation of an electrical submersible pump according to yet another example embodiment.

With reference now to FIG. 6, an example embodiment includes a method 600 of sensing a rotation of an electrical submersible pump. The method 600 can include measuring an acceleration of an electrical submersible pump in a first axis and in a second axis to thereby record a first signal and a second signal 601. The method 600 can include correlating the first signal to the second signal for a plurality of shifts of the second signal 602. The method 600 can include determining a period of the rotation of the electrical submersible pump 603. The period is a value between periodic peaks of the correlation of the first and second signals for the plurality of shifts of the second signal. The method 600 can include identifying a peak of the periodic peaks between about plus one-fourth and about minus one-fourth of the determined period of the rotation 604. The method 600 can include determining whether the first signal either leads or lags the second signal responsive to a sign of a phase shift at the identified peak 605. The method 600 can include determining a direction of a rotation of the electrical submersible pump 606 responsive to the determination of whether the first signal either leads or lags the second signal.

Figure 7:
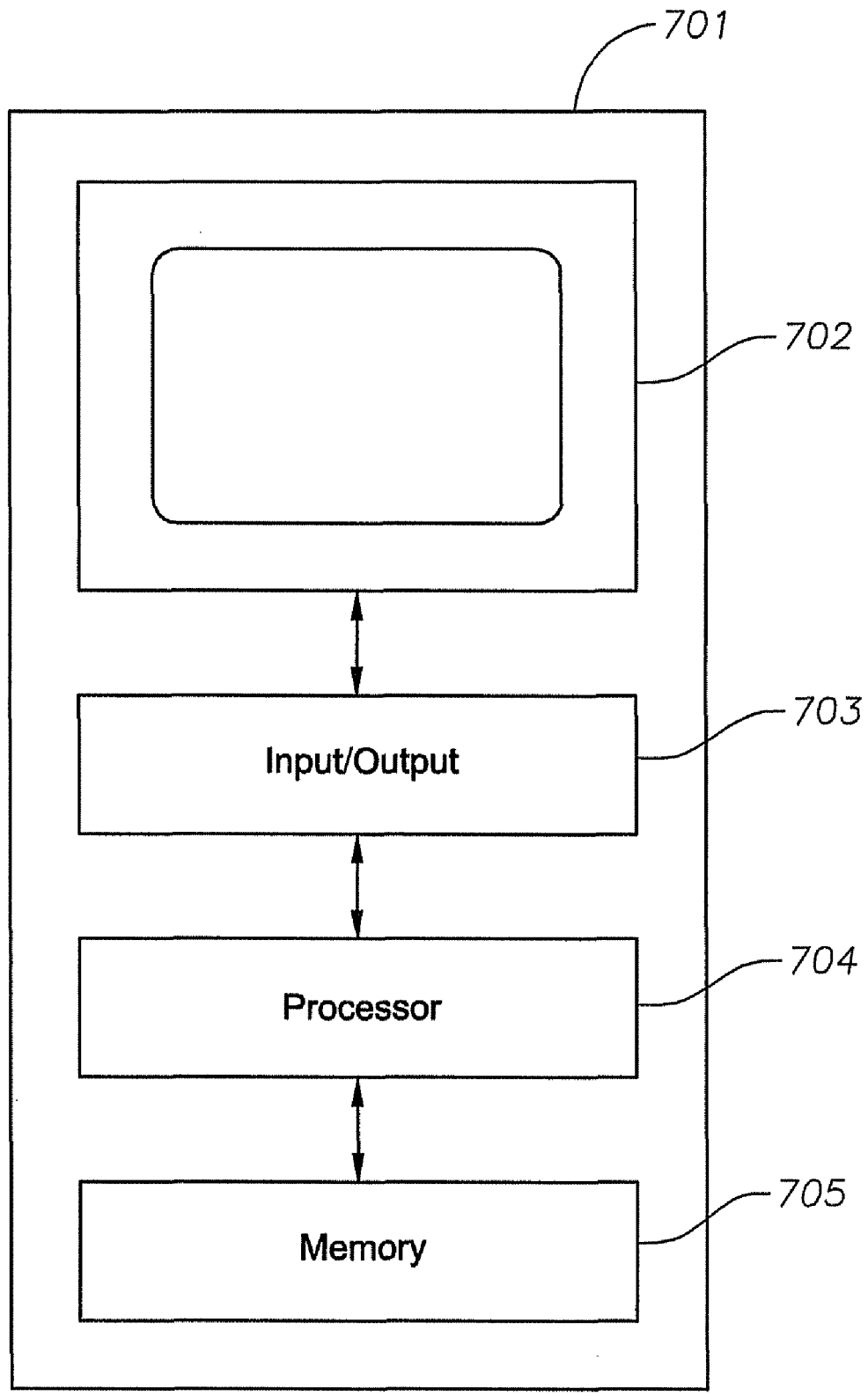
FIG. 7 is a block diagram illustrating a computer according to an example embodiment.

With reference now to FIG. 7, example embodiment includes a computer 701 having a processor 704 in communication with the XY vibration sensor. The processor 704 has input/output capabilities 703, including an optional display device 702 for alerting an operator as understood by those skilled in the art. The processor 704 has memory 705, including instructions for performing the various operations and methods as, for example, computer-implemented methods. The processor 704 is capable, for example, of determining a rotation of the electrical submersible pump by analyzing the first and second vibration signals to determine whether the first signal either leads or lags the second signal and to determine a direction of a rotation of the electrical submersible pump responsive to the determination of whether the first signal either leads or lags the second signal. The computer 701 can be located on the surface, in the wellbore, or both, as understood by those skilled in the art.

It is important to note that while embodiments of the present invention have been described in the context of a fully functional electrical submersible pump assembly and related methods, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD- ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and/or instructions related to the embodiments described above.

Many modifications and other embodiments of the invention will come to the mind of one skilled in the art having the benefit of the teachings presented in the foregoing descriptions and the associated drawings. In the drawings and specification, there have been disclosed illustrative embodiments of the invention and, although specific terms are employed, they are used in a generic and descriptive sense only and not for the purpose of limitation. Therefore, it is to be understood that the invention is not to be limited to the illustrated embodiments disclosed, and that modifications and other embodiments are intended to be included within the scope of the appended claims.

The invention claimed is:

1. A method of sensing a direction of rotation of an electrical submersible pump comprising:
   a. monitoring the pump with a vibration sensor as the pump rotates;
   b. generating output signals with the vibration sensor that represent acceleration along a directional axis and acceleration along another directional axis to estimate acceleration of the pump along directional axes that are in a plane substantially normal to an axis of the pump; and
   c. determining rotational direction of the pump by time shifting the output signals to estimate when the pump accelerates in the respective directional axes by determining a frequency of the rotation of the electrical submersible pump to thereby identify a period of the rotation, correlating signals form the directional axes where one of the correlated signals is shifted by minus one-fourth of the identified period of the rotation, where one of the correlated signals is shifted by plus one-fourth of the identified period of the rotation, and where the one of the correlated signals is not shifted, and comparing the correlations of the signals representing acceleration from the directional axes to determine which signal representing acceleration from the one of the directional axis leads or lags the signal representing acceleration from the another directional axis.

2. A method of claim 1, wherein the directional axes comprise an X axis and a Y axis.

3. A method of claim 1, wherein the step of determining a frequency of the rotation of the electrical submersible pump to thereby identify a period of the rotation involves analyzing data from a surface motor controller.

4. A method of claim 1, wherein the step of determining a frequency of the rotation of the electrical submersible pump to thereby identify a period of the rotation includes:
   performing a Fourier analysis on one of more of the following: the first vibration signal, and the second vibration signal; and
   identifying a frequency peak.

5. A method of claim 1, wherein the step of determining whether the first signal either leads or lags the second signal comprises:
   correlating the first signal to the second signal for as plurality of shifts of the second signal;
   determining a period of the rotation of the electrical submersible pump, the period being a value between periodic peaks of the correlation of the first and second signals for the plurality of shifts of the second signal;
   identifying a peak of the periodic peaks between about plus one-fourth and about minus one-fourth of the determined period of the rotation; and
   determining whether the first signal either leads or lags the second signal responsive to a sign of a phase shift at the identified peak.

6. A method of claim 1, further comprising alerting an operator of a status of the electrical submersible pump responsive to a comparison of the determined direction of rotation to an expected direction of rotation.

7. A method of claim 1, wherein the method is a computer-implemented method, and
   wherein the steps of determining whether the first signal either leads or lags the second signal and of determining a direction of a rotation of the electrical submersible pump involve analyzing the first and second signals by a computer having a processor and memory so that the data from the first and second signals result in data indicating a determination of a rotation of the electrical submersible pump.

8. A computer-implemented method of sensing a rotation of electrical submersible pump, the method comprising:
   measuring an acceleration of an electrical submersible pump in a first axis and in a second axis using a downhole vibration sensor to thereby record a first vibration signal and a second vibration signal;
   analyzing by a processor the first vibration signal and the second vibration signal to determine whether the first vibration signal either leads or lags the second vibration signal by determining by the processor a frequency of the rotation of the electrical submersible pump to thereby identify a period of the rotation, correlating by the processor the first vibration signal to the second vibration signal shifted by minus one-fourth of the identified period of the rotation, correlating by the processor the first vibration signal to the second vibration signal shifted by plus one-fourth of the identified period of the rotation, and comparing by the processor the correlations of the first and second signals to determine whether the first vibration signal either leads or lags the second vibration signal, the processor in communication with the downhole vibration sensor; and
   determining a direction of a rotation of the electrical submersible pump by the processor responsive to the determination of whether the first signal either leads or lags the second signal.

9. A method of claim 8, wherein the step of analyzing by the processor the first vibration signal and the second vibration signal to determine whether the first vibration signal either leads or lags the second vibration signal comprises:
   correlating by the processor the first vibration signal to the second vibration signal for a plurality of shifts of the second vibration signal;
   determining, by the processor it period of the rotation of the electrical submersible pump, the period being a value between periodic peaks of the correlation of the first and second vibration signals for the plurality of shifts of the second signal;
   identifying by the processor a peak of the periodic peaks between about plus one-fourth and about minus one-fourth of the determined period of the rotation; and
   determining by the processor whether the first vibration signal either leads or lags the second vibration signal responsive to a sign of a phase shift at the identified peak.

10. A method of claim 8, further comprising alerting an operator of a status of the electrical submersible pump responsive to a comparison of the determined direction of rotation to an expected direction of rotation.

11. A method of claim 8, wherein the step of determining a direction of a rotation of the electrical submersible pump by the processor comprises determining if the electrical submersible pump is experiencing a clockwise rotation, no rotation, or a counter-clockwise rotation.

12. A rotation sensor apparatus for an electrical submersible pump assembly, comprising:
an XY vibration sensor associated with an electrical submersible pump assembly positioned to measure a vibration of an electrical submersible pump in a first axis and in a second axis that creates a first vibration signal and a second vibration signal; and
a processor in communication with the XY vibration sensor and capable of determining a rotation of the electrical submersible pump by analyzing the first and second vibration signals to determine whether the first signal either leads or lags the second signal and to determine a direction of a rotation of the electrical submersible pump responsive to the determination of whether the first signal either leads or lags the second signal by determining a frequency of the rotation of the electrical submersible pump to thereby identify a period of the rotation, correlating the first signal to the second signal shifted by minus one-fourth of the identified period of the rotation, correlating the first signal to the second signal unshifted, correlating the first signal to the second signal shifted by plus one-fourth of the identified period of the rotation; and comparing the correlations of the first and second signals to determine if the electrical submersible pump is experiencing a clockwise rotation, no rotation, or a counter-clockwise rotation.

13. An apparatus of claim 12, wherein the processor determining a frequency of the rotation of the electrical submersible pump to thereby identify a period of the rotation involves analyzing data from a surface motor controller.

14. An apparatus of claim 12, wherein the processor determining a frequency of the rotation of the electrical submersible pump to thereby identify a period of the rotation includes:
the processor performing a Fourier analysis on one of more of the following: the first vibration signal, and the second vibration signal; and
the processor identifying a frequency peak.

15. An apparatus of claim 12, wherein the processor analyzing the first and second vibration signals to determine whether the first signal either leads or lags the second signal further involves:
correlating the first signal to the second vibration signal for a plurality of shifts of the second signal;
determining a period of the rotation of the electrical submersible pump, the period being a value between periodic peaks of the correlations of the first and second vibration signals for the plurality of shifts of the second signal;
identifying a peak of the periodic peaks between about plus one-fourth and minus one-fourth of the determined period of the rotation; and
determining whether the first signal either leads or lags the second signal responsive to the identified sign of a phase shift at the identified peak.

* * * * *